United States Patent
Hashimoto et al.

(10) Patent No.: US 10,870,760 B2
(45) Date of Patent: Dec. 22, 2020

(54) EPOXY GROUP-CONTAINING ORGANOPOLYSILOXANE, ULTRAVIOLET CURABLE SILICONE COMPOSITION, AND METHOD OF FORMING A CURED FILM

(71) Applicant: SHIN-ETSU CHEMICAL CO., LTD., Tokyo (JP)

(72) Inventors: Ryota Hashimoto, Annaka (JP); Shinji Irifune, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 5 days.

(21) Appl. No.: 16/341,096

(22) PCT Filed: Oct. 23, 2017

(86) PCT No.: PCT/JP2017/038105
§ 371 (c)(1),
(2) Date: Apr. 11, 2019

(87) PCT Pub. No.: WO2018/092515
PCT Pub. Date: May 24, 2018

(65) Prior Publication Data
US 2020/0190325 A1    Jun. 18, 2020

(30) Foreign Application Priority Data
Nov. 21, 2016 (JP) .................. 2016-225675

(51) Int. Cl.
| C08G 77/06 | (2006.01) |
| C08L 83/06 | (2006.01) |
| C08G 77/12 | (2006.01) |
| C08G 77/14 | (2006.01) |
| C08G 77/38 | (2006.01) |

(52) U.S. Cl.
CPC ............. *C08L 83/06* (2013.01); *C08G 77/12* (2013.01); *C08G 77/14* (2013.01); *C08G 77/38* (2013.01); *C08L 2201/10* (2013.01); *C08L 2203/16* (2013.01); *C08L 2312/04* (2013.01)

(58) Field of Classification Search
CPC .............................. C08G 77/14; C08L 83/06
See application file for complete search history.

(56) References Cited

U.S. PATENT DOCUMENTS

| 4,279,717 A | 7/1981 | Eckberg et al. | |
| 4,370,358 A * | 1/1983 | Hayes | C08L 83/06 427/515 |
| 4,985,342 A * | 1/1991 | Muramoto | G03F 7/0757 430/270.1 |
| 5,310,843 A | 5/1994 | Morita | |
| 5,358,983 A * | 10/1994 | Morita | C08L 83/06 523/455 |
| 5,360,833 A * | 11/1994 | Eckberg | C08G 59/3254 522/31 |
| 5,530,075 A * | 6/1996 | Morita | C08G 59/306 525/393 |
| 6,875,795 B2 * | 4/2005 | Irifune | C09D 183/04 428/447 |
| 2003/0232900 A1 | 12/2003 | Irifune | |
| 2008/0058441 A1 | 3/2008 | Watanabe et al. | |
| 2013/0183776 A1 | 7/2013 | Kashiwagi et al. | |

(Continued)

FOREIGN PATENT DOCUMENTS

| EP | 0 315 954 A2 | 5/1989 |
| EP | 0 541 988 A1 | 5/1993 |
| EP | 0 567 079 A1 | 10/1993 |

(Continued)

OTHER PUBLICATIONS

Crivello James V., "The Discovery and Development of Onium Salt Cationic Photoinitiators", Journal of Polymer Science: Part A: Polymer Chemistry; Polymer Chemistry Edition, Interscience Publishers, New York, NY, US, vol. 37, No. 23, pp. 4241-4254.
Apr. 3, 2020 Extended Search Report issued in European Patent Application No. 17872218.7.
May 21, 2019 International Preliminary Report on Patentability issued in International Patent Application No. PCT/JP2017/038105.
Sep. 3, 2019 Office Action issued in Japanese Patent Application No. 2016-225675.
Yamaya et al., "Silicone Taizen", Nikkan Kogyo Shinbunsha, Chapter 3, pp. 94-97.

(Continued)

*Primary Examiner* — Margaret G Moore
(74) *Attorney, Agent, or Firm* — Oliff PLC

(57) ABSTRACT

An epoxy group-containing organopolysiloxane shows the following average composition formula (1) and has an epoxy equivalent of 500 g/mol or more. The epoxy group-containing organopolysiloxane has excellent ultraviolet curability even when the content of epoxy group is small (when the epoxy equivalent is large), an ultraviolet curable silicone composition uses the same, and a method forms a cured film.

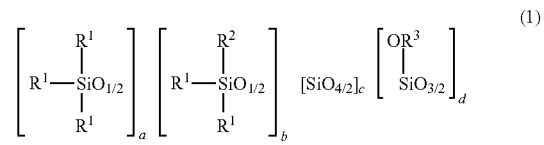

(1)

In the formula, each $R^1$ represents the same or different unsubstituted or substituted monovalent hydrocarbon group having 1 to 10 carbon atoms (except for a group containing an epoxy group); $R^2$ represents a group containing an epoxy group; $R^3$ represents a hydrogen atom or a saturated monovalent hydrocarbon group having 1 to 4 carbon atoms; "a", "b", and "c" are positive numbers, "d" is 0 or a positive number, satisfying $(a+b)/(c+d)=0.5$ to 1.0.

14 Claims, No Drawings

(56) References Cited

U.S. PATENT DOCUMENTS

2016/0289388 A1  10/2016  Fu et al.
2016/0304724 A1  10/2016  Fu et al.

FOREIGN PATENT DOCUMENTS

| | | |
|---|---|---|
| EP | 0 571 965 A1 | 12/1993 |
| JP | H01-123229 A | 5/1989 |
| JP | H02-38602 B2 | 8/1990 |
| JP | H03-128975 A | 5/1991 |
| JP | H05-105758 A | 4/1993 |
| JP | H05-295084 A | 11/1993 |
| JP | H05-320514 A | 12/1993 |
| JP | 2004-068000 A | 3/2004 |
| JP | 2005-171069 A | 6/2005 |
| JP | 4434841 B2 | 3/2010 |
| JP | 2013-147546 A | 8/2013 |
| WO | 2005/056640 A1 | 6/2005 |
| WO | 2015/099934 A1 | 7/2015 |
| WO | 2015/100258 A1 | 7/2015 |

OTHER PUBLICATIONS

Jan. 23, 2018 Search Report issued in International Patent Application No. PCT/JP2017/038105.

* cited by examiner

EPOXY GROUP-CONTAINING ORGANOPOLYSILOXANE, ULTRAVIOLET CURABLE SILICONE COMPOSITION, AND METHOD OF FORMING A CURED FILM

TECHNICAL FIELD

The present invention relates to an epoxy group-containing organopolysiloxane, an ultraviolet curable silicone composition using the same, and a method of forming a cured film.

BACKGROUND ART

Dimethylorganopolysiloxanes have been widely used in every industrial field because of the chemical features. To these dimethylorganopolysiloxanes, various reactive groups have been introduced, and the reactive group-containing organopolysiloxane also has been widely used. The main use of this reactive group-containing organopolysiloxane is a modifier for organic resins, in which the reactive group-containing organopolysiloxane reacts with an organic resin to introduce a siloxane chain as a block unit or a graft chain into the organic resin through a chemical bond to allow the organic resin to have properties such as mechanical properties including impact resistance, flexibility, and low-temperature properties; interfacial properties including abrasion resistance, repellency, release properties, moldability, and lubricity; as well as excellent physical properties including heat resistance and electrical properties.

Epoxy group-containing organopolysiloxane is one of them, with the reactive group being an epoxy group. The epoxy group-containing organopolysiloxane has been used for a resin modifier, an additive for plastics, and a textile treating agent by making the best use of reactivity of the epoxy group. These resin modifiers are expected to achieve effects such as improvement in molding properties of a thermoplastic resin and stress-lowering of an epoxy resin, which is encapsulant for a semiconductor. The textile treating agent gives less slimy feelings with smoothness and voluminousness, and is also usable with amino-modified silicone oil to give excellent properties such as smooth feelings, rebound resilience, and durability. Moreover, the epoxy group can react with various functional groups and is effective as a material that introduces a special modification group (see Non-Patent Document 1). Accordingly, novel epoxy group-containing organopolysiloxane has been widely demanded.

The epoxy group-containing organopolysiloxane is used as a component of a curable composition or a coating material. For example, the epoxy group-containing organopolysiloxane gives a transparent cured material with higher durability when it is employed as a curing component of an epoxy resin composition using an acid anhydride curing agent, and has been investigated for use as an encapsulant of photo-semiconductor device such as light emitting diode and photo diode (Patent Document 1).

In coating uses, many curing methods have been proposed to cure epoxy group-containing organopolysiloxane with an onium salt photoinitiator as a catalyst (Patent Documents 2 to 4). This kind of curing method is less inhibited by oxygen compared to curing methods using radical reaction, allowing the curing reaction to proceed favorably in air, and has been increasingly used as various coating materials.

The ultraviolet (UV) curability of these coating materials tend to depend on the content of epoxy group. It has been necessary to increase the content of epoxy group (to decrease the epoxy equivalent) to improve the ultraviolet curability. The increase of epoxy group improves the ultraviolet curability, but decreases the relative amount of organopolysiloxane moiety in the epoxy group-containing organopolysiloxane, and tends to lower the characteristic effect of organopolysiloxane. Accordingly, it has been demanded epoxy group-containing organopolysiloxane that is ultraviolet curable to form a coating with higher hardness after ultraviolet curing even when the content of epoxy group is small (when the epoxy equivalent is large).

CITATION LIST

Patent Literature

Patent Document 1: Japanese Patent No. 4434841
Patent Document 2: Japanese Examined Patent Application Publication No. H02-38602
Patent Document 3: Japanese Unexamined Patent Application Publication No. H03-128975
Patent Document 4: Japanese Unexamined Patent Application Publication No. 2004-068000

Non-Patent Literature

Non Patent Document 1: Silicone Taizen, Chapter 3, Nikkan Kogyo shinbunsha

SUMMARY OF INVENTION

Technical Problem

The present invention was accomplished in view of the above-described circumstances. It is an object of the present invention to provide an epoxy group-containing organopolysiloxane that is excellent in ultraviolet curability even when the content of epoxy group is small (when the epoxy equivalent is large), an ultraviolet curable silicone composition using the same, and a method of forming a cured film.

Solution to Problem

To solve the foregoing problems, the present invention provides an epoxy group-containing organopolysiloxane shown by the following average composition formula (1) and having an epoxy equivalent of 500 g/mol or more,

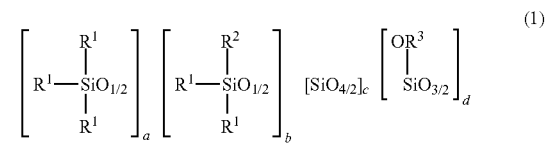

[wherein each $R^1$ represents the same or different unsubstituted or substituted monovalent hydrocarbon group having 1 to 10 carbon atoms (except for a group containing an epoxy group); $R^2$ represents a group containing an epoxy group; $R^3$ represents a hydrogen atom or a saturated monovalent hydrocarbon group having 1 to 4 carbon atoms; "a", "b", and "c" are positive numbers, "d" is 0 or a positive number, satisfying (a+b)/(c+d)=0.5 to 1.0].

The inventive epoxy group-containing organopolysiloxane like this is curable by ultraviolet irradiation even when the content of epoxy group is small (when the epoxy equivalent is large). The use of epoxy group-containing organopolysiloxane like this gives a cured film with transparency.

In this case, it is preferable that the inventive epoxy group-containing organopolysiloxane have a weight average molecular weight of 8000 or more and a form of solid at 25° C.

The epoxy group-containing organopolysiloxane like this is preferable since it is easy to handle due to the solid form at 25° C. (room temperature) and gives a cured film with sufficiently high hardness.

In this case, it is preferable that the epoxy group-containing organopolysiloxane be an addition reaction product of (A) an organohydrogenpolysiloxane composed of an $R^1_3SiO_{1/2}$ unit, an $R^1_2HSiO_{1/2}$ unit, an $SiO_{4/2}$ unit, and an $R^3OSiO_{3/2}$ unit, shown by the following average composition formula (2) and having an Si—H group content of 0.01 to 0.3 mol/100 g,

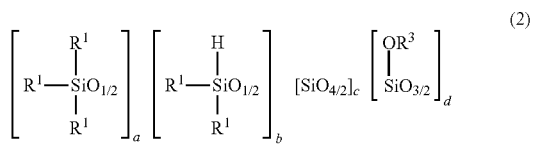

(2)

[wherein $R^1$, $R^3$, "a", "b", "c", and "d" have the same meanings as defined above]; and (B) a compound having both of an alkenyl group and an epoxy group.

The epoxy group-containing organopolysiloxane like this can be synthesized easily.

In this case, it is preferable that (A) the organohydrogenpolysiloxane have a weight average molecular weight of 6000 or more and a form of solid at 25° C.

The (A) organohydrogenpolysiloxane like this is preferable since it makes it possible to synthesize epoxy group-containing organopolysiloxane that is solid at room temperature (25° C.)

The present invention also provides an ultraviolet curable silicone composition, comprising the epoxy group-containing organopolysiloxane described above, and an onium salt photoinitiator to produce a cation species by ultraviolet irradiation.

The ultraviolet curable silicone composition like this is curable by ultraviolet irradiation even when the content of epoxy group is small (when the epoxy equivalent is large) in the epoxy group-containing organopolysiloxane, allowing the cured film to have transparency.

The present invention also provides a method of forming a cured film, comprising applying the ultraviolet curable silicone composition described above onto a substrate, and performing ultraviolet irradiation to form a cured film.

The inventive ultraviolet curable silicone composition is excellent in ultraviolet curability and can form a cured film by ultraviolet irradiation. Additionally, cured film thus formed is a transparent coating.

Advantageous Effects of Invention

The inventive epoxy group-containing organopolysiloxane and the ultraviolet curable silicone composition using the same make it possible to give a cured film by ultraviolet irradiation even when the content of epoxy group is small, allowing the cured film to have transparency and higher hardness under certain circumstances, and are usable as a coating material for various base materials. This epoxy group-containing organopolysiloxane can be a solid form at room temperature (25° C.) and is easy to handle thereby, can be easily mixed with other resins, and can be used as a silicone modifier for various resins.

DESCRIPTION OF EMBODIMENTS

In order to solve such problems, the present inventors have diligently studied epoxy group-containing organopolysiloxane with novel properties. As a result, the present inventors have found that the use of epoxy group-containing organopolysiloxane having an epoxy equivalent of 500 g/mol or more and a backbone of an $SiO_{4/2}$ unit, that is, a quadrivalent siloxane unit (Q unit) as a component of ultraviolet curable composition containing an onium salt photoinitiator allows the composition to be easily cured by ultraviolet (UV) irradiation even when the content of epoxy group is low, and makes the cured film transparent while having higher hardness under certain circumstances; thereby bringing the present invention to completion.

That is, the present invention is an epoxy group-containing organopolysiloxane shown by the following average composition formula (1) and having an epoxy equivalent of 500 g/mol or more,

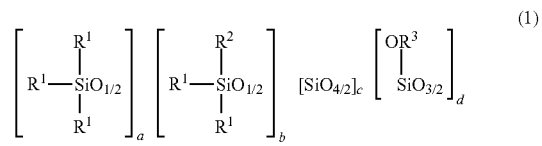

(1)

[wherein each $R^1$ represents the same or different unsubstituted or substituted monovalent hydrocarbon group having 1 to 10 carbon atoms (except for a group containing an epoxy group); $R^2$ represents a group containing an epoxy group; $R^3$ represents a hydrogen atom or a saturated monovalent hydrocarbon group having 1 to 4 carbon atoms; "a", "b", and "c" are positive numbers, "d" is 0 or a positive number, satisfying (a+b)/(c+d)=0.5 to 1.0].

Hereinafter, the present invention will be described in detail, but the present invention is not limited thereto.

[Epoxy Group-Containing Organopolysiloxane]

The inventive epoxy group-containing organopolysiloxane is shown by the following average composition formula (1) and has an epoxy equivalent of 500 g/mol or more,

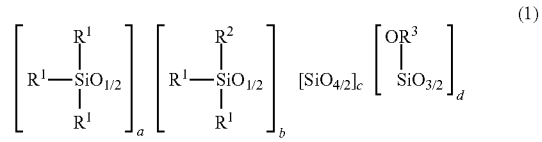

(1)

[wherein each $R^1$ may be the same or different and represents unsubstituted or substituted monovalent hydrocarbon group having 1 to 10 carbon atoms (except for a group containing an epoxy group); $R^2$ represents a group containing an epoxy group; $R^3$ represents a hydrogen atom or a saturated monovalent hydrocarbon group having 1 to 4 carbon atoms; "a", "b", and "c" are positive numbers, and "d" is 0 or a positive number, satisfying (a+b)/(c+d)=0.5 to 1.0].

In the average composition formula (1), $R^1$ represents the same or different unsubstituted or substituted monovalent hydrocarbon group having 1 to 10 carbon atoms (except for a group containing an epoxy group). Illustrative examples of $R^1$ like this include unsubstituted hydrocarbon groups such as alkyl groups including a methyl group, an ethyl group, a propyl group, and a butyl group; cycloalkyl groups including a cyclohexyl group; and aryl groups including a phenyl group and a tolyl group; as well as substituted monovalent hydrocarbon groups which is substituted by a group other than epoxy group-containing groups, and is selected from a hydroxypropyl group, a cyanoethyl group, a 1-chloropropyl group, a 3,3,3-trifluoropropyl group, and so on, in which all of or part of the hydrogen atoms bonded to carbon atoms of each of the above described hydrocarbon groups are replaced by a hydroxy group(s), a cyano group(s), or a halogen atom(s).

$R^2$ represents a substituent containing an epoxy group, and illustrative examples thereof include the following, but are not limited thereto. In the following chemical formulae, each of "x", "y", and "z" may be 2 to 10.

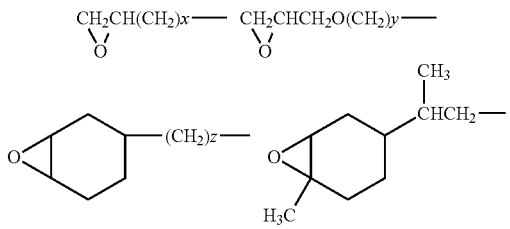

$R^3$ represents a hydrogen atom or a saturated monovalent hydrocarbon group having 1 to 4 carbon atoms, and is preferably a hydrogen atom or a methyl group.

In each molecule, "a", "b", and "c" are positive numbers; "d" is 0 or a positive number; "a", "b", "c" and "d" may be selected so as to have an epoxy equivalent of 500 g/mol or more, which represents a content of epoxy group in the molecule; and are necessary to satisfy (a+b)/(c+d)=0.5 to 1.0, preferably 0.6 to 0.9. When (a+b)/(c+d) is more than 1.0, this epoxy group-containing organopolysiloxane fails to give a coating film with sufficiently high hardness after ultraviolet curing. On the other hand, when (a+b)/(c+d) is less than 0.5, the synthesis becomes difficult.

The inventive epoxy group-containing organopolysiloxane has an epoxy equivalent of 500 g/mol or more. The upper limit thereof is not particularly limited, but may be 10000 g/mol or less.

The inventive epoxy group-containing organopolysiloxane preferably has a weight average molecular weight of 5000 or more, more preferably 8000 or more, although it is not particularly limited. When the weight average molecular weight is 5000 or more, this epoxy group-containing organopolysiloxane is allowed to give a cured film with sufficiently high hardness after ultraviolet curing. The weight average molecular weight of 8000 or more is particularly preferable since it makes the organopolysiloxane be solid at room temperature and easy to handle thereby.

The inventive epoxy group-containing organopolysiloxane is preferably an addition reaction product of (A) an organohydrogenpolysiloxane composed of an $R^1_3SiO_{1/2}$ unit, an $R^1_2HSiO_{1/2}$ unit, an $SiO_{4/2}$ unit, and an $R^3OSiO_{3/2}$ unit, shown by the following average composition formula (2) and having an Si—H group content of 0.01 to 0.3 mol/100 g,

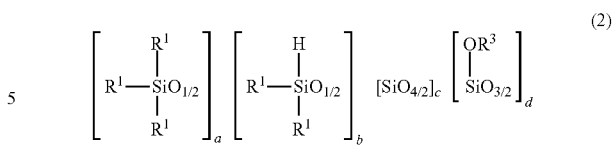

[wherein $R^1$, $R^3$, "a", "b", "c", and "d" have the same meanings as defined above]; and (B) a compound having both of an alkenyl group and an epoxy group.

In the average composition formula (2), $R^1$, $R^3$, "a", "b", "c", and "d" have the same meanings as defined above. That is, each $R^1$ represents the same or different unsubstituted or substituted monovalent hydrocarbon group having 1 to 10 carbon atoms (except for a group containing an epoxy group); $R^3$ represents a hydrogen atom or a saturated monovalent hydrocarbon group having 1 to 4 carbon atoms; "a", "b", and "c" are positive numbers, and "d" is 0 or a positive number, satisfying (a+b)/(c+d)=0.5 to 1.0, preferably 0.6 to 0.9. This organohydrogenpolysiloxane shown by the average composition formula (2) contains an SiH group, and the amount is 0.01 to 0.3 mol/100 g, preferably 0.02 to 0.2 mol/100 g.

The weight average molecular weight of this (A) organohydrogenpolysiloxane is preferably 3000 or more, more preferably 6000 or more, although it is not particularly limited thereto. The weight average molecular weight of 3000 or more, particularly 6000 or more is preferable since the epoxy group-containing organopolysiloxane synthesized therefrom tends to be solid at room temperature (25° C.)

As (B) the compound having both of an alkenyl group and an epoxy group, any compound can be used as long as it contains both of an alkenyl group and an epoxy group, and illustrative examples thereof include allyl glycidyl ether and 1,2-epoxy-4-vinylcyclohexane, but are not limited thereto.

The method for obtaining an addition reaction product of (A) organohydrogenpolysiloxane and (B) a compound having both of an alkenyl group and an epoxy group may be an addition reaction of (A) the organohydrogenpolysiloxane and (B) the compound having both of an alkenyl group and an epoxy group using a platinum group metal catalyst.

In this case, the blend ratio of (A) the organohydrogenpolysiloxane and (B) the compound having both of an alkenyl group and an epoxy group may be generally such that the molar number of (B) the compound having both of an alkenyl group and an epoxy group is 0.8 to 1.5 times, more preferably 0.9 to 1.3 times, relative to the molar number of SiH groups in (A) the organohydrogenpolysiloxane.

As the platinum group metal compound, any known addition reaction catalyst can be used. These platinum group metal catalysts include catalysts of platinum base, palladium base, rhodium base, and ruthenium base. Among them, platinum base catalysts are preferably used. These platinum base catalysts include chloroplatinic acid, solution of chloroplatinic acid in alcohol or aldehyde, a chloroplatinic acid complex of olefin of every kind or vinylsiloxane. Each of these platinum group metal catalysts is added in a catalytic amount, and the amount may be in the range of 1 to 50 ppm, more preferably 5 to 20 ppm in terms of the platinum group metal.

The temperature and the time of the reaction are not particularly limited and may be such that (A) the organohydrogenpolysiloxane and (B) the compound having both of an alkenyl group and an epoxy group react sufficiently with each other. The reaction temperature may be generally 60 to 140° C., preferably 80 to 120° C.; and the reaction time may be generally 0.5 to 12 hours, preferably 3 to 12 hours.

This reaction may be performed in an organic solvent. Illustrative examples of this organic solvent include aromatic hydrocarbon solvents such as toluene and xylene; aliphatic hydrocarbon solvents such as hexane, octane, isoparaffin; ether solvents such as diisopropyl ether and 1,4-dioxane; and mixed solvents thereof. Particularly preferable ones are aromatic hydrocarbon solvents such as toluene and xylene, as well as aliphatic hydrocarbon solvents such as hexane, octane and isoparaffin. The reaction product may be used with the remaining solvent contained or after removing the solvent by stripping.

[Ultraviolet Curable Silicone Composition]

The present invention also provide an ultraviolet curable silicone composition, containing the inventive epoxy group-containing organopolysiloxane described above, and an onium salt photoinitiator to produce a cation species by ultraviolet irradiation.

Illustrative examples of the onium salt photoinitiator that produces a cation species by ultraviolet irradiation, which is contained in the inventive ultraviolet curable silicone composition, include diaryl iodonium salts, triarylsulfonium salts, triarylselenonium salts, tatraarylphosphonium salts, and aryldiazonium salts each shown by $R^4{}_2I^+X^-$, $R^4{}_3S^+X^-$, $R^4{}_3Se^+X^-$, $R^4{}_4P^+X^-$, and $R^4N_2{}^+X^-$ ($R^4$ represents an aryl group; $X^-$ represents an anion such as $SbF_6{}^-$, $AsF_6{}^-$, $PF_6{}^-$, $BF_4{}^-$, $HSO_4{}^-$, and $ClO_4{}^-$). In view of curing reactivity, hexafluoroantimonates of diaryl iodonium and triarylsulfonium are preferable.

The amount of the onium salt photoinitiator to be added is preferably 0.1 to 20 parts by mass relative to 100 parts by mass of the ultraviolet curable silicone composition, but not particularly limited thereto. The amount of 0.1 parts by mass or more allows the composition to have sufficient curability, and the amount of 20 parts by mass or less allows the surface state of the cured film to be prevented from risks of causing adversary affects such as coloring.

In order to adjust the hardness or curability, it is possible to combine other epoxy group-containing organopolysiloxane (which is other than the epoxy group-containing organopolysiloxane of the present invention) and/or an epoxy group-containing compound or resin that does not contain silicone.

In accordance with needs, the inventive ultraviolet curable silicone composition may contain epoxy base diluent, vinyl ether base diluent, an adhesion improver for a base material, a leveling agent, an antistatic agent, an antifoaming agent, pigment, and other organopolysiloxane, and may be diluted with an organic solvents.

[Method of Forming a Cured Film]

The present invention also provides a method of forming a cured film, including applying the inventive ultraviolet curable silicone composition described above, and performing ultraviolet irradiation to form a cured film.

The inventive ultraviolet curable silicone composition may be applied to a base material made from a material such as glass, plastic, ceramic, and metal. The shape of the base material may be a plate, a film, a sheet, and a bottle, though it is not particularly limited thereto. Among them, a plate and a film are preferable. The thickness of the base material is generally in the range of 5 to 500 μm in case of a film or a sheet, and is preferably in the range of 0.005 to 0.1 m in case of a plate with a thickness, although it is not particularly limited thereto.

The method of applying the inventive ultraviolet curable silicone composition onto a substrate (coating method) is not particularly limited, and it is possible to coat the surface of various base material to form a thin film layer of the inventive ultraviolet curable silicone composition by known method such as flow coating, immersion coating, spin coating, spray coating, flood coating, gravure coating, Mayer bar coating, and dip coating. The surface of a base material before coating may be previously subjected to primer treatment with a silane coupling agent or hydrolysate thereof, surface activating treatment such as corona treatment, and known anchor treatment using acrylic resin or urethane resin.

The amount of coating of the inventive ultraviolet curable silicone composition is preferably an amount such that the cured material layer of the composition has a thickness of 0.5 to 30 μm, particularly 1 to 20 μm when resistance to marring is required, but is not particularly limited thereto. Incidentally, when a two layered resin layer is formed containing a primer layer and a hard coat layer composed of the inventive ultraviolet curable silicone composition, it is preferable to make the cured primer layer have a thickness of 0.1 to 20 μm, particularly 0.5 to 10 μm; to make the cured hard coat layer have a thickness of 0.5 to 30 μm, particularly 1 to 20 μm; and to make the cured resin layer with two or more layers have an overall thickness of 0.6 to 50 μm, particularly 1.5 to 30 μm. Illustrative examples of the ultraviolet light source include a high-pressure mercury-vapor lamp, a moderate-pressure mercury-vapor lamp, a low-pressure mercury-vapor lamp, a metal halide lamp, and a mercury arc lamp. The irradiation dosage of ultraviolet is generally 10 mJ/cm² at least, preferably 100 to 3000 mJ/cm².

The inventive epoxy group-containing organopolysiloxane can be a solid form at room temperature (25° C.) and is easy to handle thereby, can be easily mixed with other resins, and can be used as a silicone modifier for various resins. This can be used as a component of an ultraviolet curable silicone composition to give a cured film by ultraviolet irradiation even when the content of epoxy group is small, with the cured film having transparency and higher hardness under certain circumstances, and is usable as a coating material for various base materials.

EXAMPLE

Hereinafter, the present invention will be described specifically by showing Examples and Comparative Examples, but the present invention is not limited to the following Examples.

Example 1

Into a four-neck flask equipped with a stirrer, a thermometer, a reflux condenser, and a dropping funnel, 100 parts by mass of 50% solution of organohydrogenpolysiloxane in isododecane was introduced, together with 0.1 parts by mass of 0.5 mass % solution of platinum catalyst in toluene, with the organohydrogenpolysiloxane having the average composition formula (2) in which $R^1$ was a methyl group, $R^3$ was a hydrogen atom, the Si—H group content was 0.233 mol/100 g, and (a+b)/(c+d)=0.7, and having a weight average molecular weight of 13000. This mixture was heated to 80° C., and then 16.9 parts by mass of 1,2-epoxy-4-vinyl-cyclohexane was introduced into the dropping funnel and dropped to the mixture over 10 minutes. After finishing the dropping, this was stirred for 7 hours at 80° C. At this time, the progress of reaction was confirmed by $^1$H-NMR in which the peak of hydrosilyl group (4.6 to 4.8 ppm) almost disappeared and a new peak of silethylene (0.5 to 0.7 ppm) occurred. The reaction solution was cooled to room temperature and treated with activated charcoal, followed by filtration. Then, the volatile components were removed by stripping to give 60.3 parts by mass of Silicone-A, which corresponds to the epoxy group-containing organopolysiloxane of the present invention. This was a white solid and had an epoxy equivalent of 650 g/mol and a weight average molecular weight of 18000.

Example 2

Into a four-neck flask equipped with a stirrer, a thermometer, a reflux condenser, and a dropping funnel, 100 parts by mass of 50% solution of organohydrogenpolysiloxane in isododecane was introduced, together with 0.1 parts by mass of 0.5 mass % solution of platinum catalyst in toluene, with the organohydrogenpolysiloxane having the average composition formula (2) in which $R^1$ was a methyl group, $R^3$ was a hydrogen atom, the Si—H group content was 0.131 mol/100 g, and (a+b)/(c+d)=0.7, and having a weight average molecular weight of 13000. This mixture was heated to 80° C., and then 9.8 parts by mass of 1,2-epoxy-4-vinylcyclohexane was introduced into the dropping funnel and dropped to the mixture over 10 minutes. After finishing the dropping, this was stirred for 7 hours at 80° C. At this time, the progress of reaction was confirmed by $^1$H-NMR in which the peak of hydrosilyl group (4.6 to 4.8 ppm) almost disappeared and a new peak of silethylene (0.5 to 0.7 ppm) occurred. The reaction solution was cooled to room temperature and treated with activated charcoal, followed by filtration. Then, the volatile components were removed by stripping to give 55.2 parts by mass of Silicone-B, which corresponds to the epoxy group-containing organopolysiloxane of the present invention. This was a white solid and had an epoxy equivalent of 3300 g/mol and a weight average molecular weight of 15500.

Example 3

Into a four-neck flask equipped with a stirrer, a thermometer, a reflux condenser, and a dropping funnel, 100 parts by mass of 50% solution of organohydrogenpolysiloxane in isododecane was introduced, together with 0.1 parts by mass of 0.5 mass % solution of platinum catalyst in toluene, with the organohydrogenpolysiloxane having the average composition formula (2) in which $R^1$ was a methyl group, $R^3$ was a hydrogen atom, the Si—H group content was 0.233 mol/100 g, and (a+b)/(c+d)=0.7, and having a weight average molecular weight of 13000. This mixture was heated to 80° C., and then 2.6 parts by mass of 1,2-epoxy-4-vinylcyclohexane was introduced into the dropping funnel and dropped to the mixture over 10 minutes. After finishing the dropping, this was stirred for 7 hours at 80° C. At this time, the progress of reaction was confirmed by $^1$H-NMR in which the peak of hydrosilyl group (4.6 to 4.8 ppm) almost disappeared and a new peak of silethylene (0.5 to 0.7 ppm) occurred. The reaction solution was cooled to room temperature and treated with activated charcoal, followed by filtration. Then, the volatile components were removed by stripping to give 47.7 parts by mass of Silicone-C, which corresponds to the epoxy group-containing organopolysiloxane of the present invention. This was a white solid and had an epoxy equivalent of 6100 g/mol and a weight average molecular weight of 13500.

Example 4

Into a four-neck flask equipped with a stirrer, a thermometer, a reflux condenser, and a dropping funnel, 100 parts by mass of 50% solution of organohydrogenpolysiloxane in isododecane was introduced, together with 0.1 parts by mass of 0.5 mass % solution of platinum catalyst in toluene, with the organohydrogenpolysiloxane having the average composition formula (2) in which $R^1$ was a methyl group, $R^3$ was a hydrogen atom, the Si—H group content was 0.233 mol/100 g, and (a+b)/(c+d)=0.7, and having a weight average molecular weight of 13000. This mixture was heated to 80° C., and then 15.5 parts by mass of allyl glycidyl ether was introduced into the dropping funnel and dropped to the mixture over 10 minutes. After finishing the dropping, this was stirred for 7 hours at 80° C. At this time, the progress of reaction was confirmed by $^1$H-NMR in which the peak of hydrosilyl group (4.6 to 4.8 ppm) almost disappeared and a new peak of silethylene (0.5 to 0.7 ppm) occurred. The reaction solution was cooled to room temperature and treated with activated charcoal, followed by filtration. Then, the volatile components were removed by stripping to give 56.2 parts by mass of Silicone-D, which corresponds to the epoxy group-containing organopolysiloxane of the present invention. This was a white solid and had an epoxy equivalent of 650 g/mol and a weight average molecular weight of 17500.

Example 5

Into a four-neck flask equipped with a stirrer, a thermometer, a reflux condenser, and a dropping funnel, 100 parts by mass of 50% solution of organohydrogenpolysiloxane in isododecane was introduced, together with 0.1 parts by mass of 0.5 mass % solution of platinum catalyst in toluene, with the organohydrogenpolysiloxane having the average composition formula (2) in which $R^1$ was a methyl group, $R^3$ was a hydrogen atom, the Si—H group content was 0.242 mol/100 g, and (a+b)/(c+d)=0.7, and having a weight average molecular weight of 4000. This mixture was heated to 80° C., and then 18.1 parts by mass of 1,2-epoxy-4-vinylcyclohexane was introduced into the dropping funnel and dropped to the mixture over 10 minutes. After finishing the dropping, this was stirred for 7 hours at 80° C. At this time, the progress of reaction was confirmed by $^1$H-NMR in which the peak of hydrosilyl group (4.6 to 4.8 ppm) almost disappeared and a new peak of silethylene (0.5 to 0.7 ppm) occurred. The reaction solution was cooled to room temperature and treated with activated charcoal, followed by filtration. Then, the volatile components were removed by stripping to give 61.2 parts by mass of Silicone-E, which corresponds to the epoxy group-containing organopolysiloxane of the present invention. This was viscous liquid and had an epoxy equivalent of 650 g/mol and a weight average molecular weight of 6000.

Example 6

To 200 parts by mass of 50% solution of Silicone-A (synthesized in Example 1) in isododecane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby to prepare a test piece. The obtained coating was transparent and free from tackiness.

Example 7

To 200 parts by mass of 50% solution of Silicone-B (synthesized in Example 2) in isododecane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby. The obtained coating was transparent and free from tackiness.

Example 8

To 200 parts by mass of 50% solution of Silicone-C (synthesized in Example 3) in isododecane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby. The obtained coating was transparent and free from tackiness.

Example 9

To 200 parts by mass of 50% solution of Silicone-D (synthesized in Example 4) in isododecane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby to prepare a test piece. The obtained coating was transparent and free from tackiness.

Example 10

To 100 parts by mass of 50% solution of Silicone-A (synthesized in Example 1) in isododecane as well as 50 parts by mass of a mixture of 2,4,6,8-tetramethyl-2,4-bis[2-(7-oxabicyclo[4.1.0]heptane-3-yl)ethyl]-6,8-dipropylcyclotetrasiloxane and 2,4,6,8-tetramethyl-2,6-bis[2-(7-oxabicyclo[4.1.0]heptane-3-yl)ethyl]-4,8-dipropylcyclotetrasiloxane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby to prepare a test piece. The obtained coating was transparent and free from tackiness.

Incidentally, the epoxy equivalent of the mixture of Silicone-A, 2,4,6,8-tetramethyl-2,4-bis[2-(7-oxabicyclo[4.1.0]heptane-3-yl)ethyl]-6,8-dipropylcyclotetrasiloxane, and 2,4,6,8-tetramethyl-2,6-bis[2-(7-oxabicyclo[4.1.0]heptane-3-yl)ethyl]-4,8-dipropylcyclotetrasiloxane was 475 g/mol at the mixing.

Example 11

To 50 parts by mass of 50% solution of Silicone-A (synthesized in Example 1) in isododecane as well as 75 parts by mass of a mixture of 2,4,6,8-tetramethyl-2,4-bis[2-(7-oxabicyclo[4.1.0]heptane-3-yl)ethyl]-6,8-dipropylcyclotetrasiloxane and 2,4,6,8-tetramethyl-2,6-bis[2-(7-oxabicyclo[4.1.0]heptane-3-yl)ethyl]-4,8-dipropylcyclotetrasiloxane, 1 part by mass of bis[4-n-alkyl ($C_{10}$ to $C_{13}$)-phenyl]iodonium hexafluoroantimonate was added. This was well stirred to give a coating material, which corresponds to the ultraviolet curable silicone composition of the present invention. This coating material was applied to a glass plate so as to form a cured film with a thickness of 20 μm, and the isododecane was volatilized in a drier at 60° C. Then, this was introduced into a high-pressure mercury-vapor lamp (UV irradiation apparatus manufactured by EYE GRAPHICS CO. LTD.) with irradiation energy of 400 mJ/cm$^2$ (the irradiation energy at the region of 365 nm measured with a UV meter UVPF-Al manufactured by EYE GRAPHICS CO. LTD.) and cured thereby to prepare a test piece. The obtained coating was transparent and free from tackiness.

Incidentally, the epoxy equivalent of the mixture of Silicone-A, 2,4,6,8-tetramethyl-2,4-bis[2-(7-oxabicyclo[4.1.0]heptane-3-yl)ethyl]-6,8-dipropylcyclotetrasiloxane, and 2,4,6,8-tetramethyl-2,6-bis[2-(7-oxabicyclo[4.1.0]heptane-3-yl)ethyl]-4,8-dipropylcyclotetrasiloxane was 388 g/mol at the mixing.

Comparative Example 1

To 100 parts by mass of a mixture of 2,4,6,8-tetramethyl-2,4-bis[2-(7-oxabicyclo[4.1.0]heptane-3-yl)ethyl]-6,8-dipropylcyclotetrasiloxane and 2,4,6,8-tetramethyl-2,6-bis[2-(7-oxabicyclo[4.1.0]heptane-3-yl)ethyl]-4,8-dipropylcyclotetrasiloxane (epoxy equivalent: 300 g/mol), 1 part by mass of bis[4-n-alkyl ($C_{10}$ to $C_{13}$)-phenyl]iodonium hexafluoroantimonate was added, and this mixture was well stirred. This coating material was applied to a glass plate so as to form a cured film with a thickness of 20 Then, this was introduced into a high-pressure mercury-vapor lamp (UV irradiation apparatus manufactured by EYE GRAPHICS CO. LTD.) with irradiation energy of 400 mJ/cm² (the irradiation energy at the region of 365 nm measured with a UV meter UVPF-A1 manufactured by EYE GRAPHICS CO. LTD.) and cured thereby to prepare a test piece. The obtained coating was transparent and free from tackiness.

Comparative Example 2

To 100 parts by mass of epoxy group-containing organopolysiloxane shown by the following formula (3) (epoxy equivalent: 1500 g/mol), 1 part by mass of bis[4-n-alkyl ($C_{10}$ to $C_{13}$)-phenyl]iodonium hexafluoroantimonate was added, and this mixture was well stirred. This coating material was applied to a glass plate so as to form a cured film with a thickness of 20 This was introduced into a high-pressure mercury-vapor lamp (UV irradiation apparatus manufactured by EYE GRAPHICS CO. LTD.) with irradiation energy of 400 mJ/cm² (the irradiation energy at the region of 365 nm measured with a UV meter UVPF-A1 manufactured by EYE GRAPHICS CO. LTD.), but was cured insufficiently to give coating partly having tackiness.

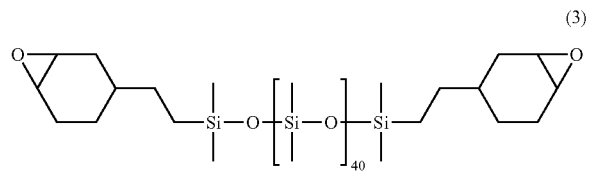

(3)

In Examples and Comparative Examples described above, each property was measured and evaluated by the following methods. The results are shown in Table 1.
(1) Method of Measuring Properties of Compounds
(1.1) Weight Average Molecular Weight The weight average molecular weight was measured for a solution of a certain mass of each sample diluted with a solvent to concentration of 0.3 mass % using a liquid chromatography HLLC-8220GPC manufactured by TOSOH CORPORATION, which was corrected for molecular weight in terms of standard polystyrene. For epoxy group-containing organopolysiloxane shown by the average composition formula (1), THF was used as a solvent; and for organohydrogenpolysiloxane shown by the average composition formula (2), toluene was used as a solvent.
(1.2) Epoxy Equivalent The epoxy equivalent was calculated by back titration of a certain mass of each sample dissolved in 1,4-dioxane using hydrochloric acid and sodium hydroxide. The titration was performed using an automatic titrator (COM-1750 manufactured by Hiranuma Sangyo Co., Ltd.). In each sample in a solid form, the epoxy equivalent was measured for a sample diluted with each solvent, and the intended value was determined by calculating from the concentration of dilution.
(2) Method of Measuring Properties of Cured Film
(2.1) Appearance of Coating (Transparency of Coating) and State of Curing The appearance of the cured film (transparency of coating) of each test piece was observed by visual inspection. The state of curing was examined by touching using a finger to evaluate the sample free from tackiness to be good and the sample with tackiness to be bad.

(2.2) Pencil Hardness Test

Onto each test piece placed in a horizontal state, pencils with different hardness was pressed to the coating at an angle of 45±1° under a loading of 500±10 g to measure the hardness of coating.

As shown in the results in Table 1, each silicone composition containing the inventive epoxy group-containing organopolysiloxane (Examples 6 to 11) was excellent in ultraviolet curability, and the cured film thereof was transparent.

TABLE 1

| | Epoxy equivalent | Curability | Transparency of coating | Pencil hardness |
|---|---|---|---|---|
| Example 6 | 650 | good | transparent | 4H |
| Example 7 | 3300 | good | transparent | unmeasurable |
| Example 8 | 6100 | good | transparent | unmeasurable |
| Example 9 | 650 | good | transparent | unmeasurable |
| Example 10 | 650 (475 at mixing) | good | transparent | H |
| Example 11 | 650 (388 at mixing) | good | transparent | HB |
| Comparative Example 1 | 300 | good | transparent | B |
| Comparative Example 2 | 1500 | bad | transparent | unmeasurable |

The epoxy group-containing organopolysiloxane (3) used in Comparative Example 2 was cured insufficiently by ultraviolet irradiation, and the obtained film partly had tackiness. On the other hand, the inventive epoxy group-containing organopolysiloxane, as Silicone-B and Silicone-C used in Examples 7 and 8, underwent ultraviolet curing even when the epoxy equivalent was larger than that of the epoxy group-containing organopolysiloxane (3) to give transparent coating.

When Comparative Example 1 and Example 6 are compared, Silicone-A used in Example 6 had an epoxy equivalent larger than that of the epoxy group-containing organopolysiloxane used in Comparative Example 1, but the cured film was harder in Example 6 compared to that of Comparative Example 1, showing that higher hardness could be obtained even when the epoxy equivalent was large.

Moreover, addition of the inventive epoxy group-containing organopolysiloxane (Silicone-A) to the epoxy group-containing organopolysiloxane used in Comparative Example 1 (Examples 10 and 11) successfully heightened the hardness of each cured film than in Comparative Example 1 while the epoxy equivalent was larger at mixing compared to that of siloxane mixture in Comparative Example 1.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:
1. An ultraviolet curable silicone composition, comprising
an onium salt photoinitiator that is configured to produce a cation species upon ultraviolet irradiation, and
an epoxy group-containing organopolysiloxane that is a solid at 25° C. and that has an epoxy equivalent of 500 g/mol or more, and a weight average molecular weight of 8000 or more, wherein the epoxy group-containing organopolysiloxane is shown by the following average composition formula (1):

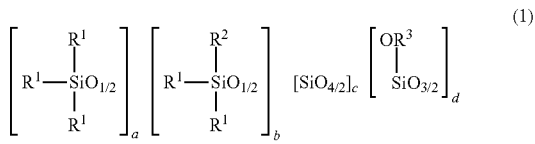

where
each $R^1$ represents the same or different unsubstituted or substituted monovalent hydrocarbon group having 1 to 10 carbon atoms (except for a group containing an epoxy group);
$R^2$ represents a group containing an epoxy group;
$R^3$ represents a hydrogen atom or a saturated monovalent hydrocarbon group having 1 to 4 carbon atoms;
"a", "b", "c", and "d" are positive numbers, satisfying (a+b)/(c+d)=0.5 to 1.0.

2. The ultraviolet curable silicone composition according to claim 1, wherein the epoxy group-containing organopolysiloxane is an addition reaction product of
(A) an organohydrogenpolysiloxane composed of an $R^1{}_3SiO_{1/2}$ unit, an $R^1{}_2HSiO_{1/2}$ unit, an $SiO_{4/2}$ unit, and an $R^3OSiO_{3/2}$ unit, shown by the following average composition formula (2) and having an Si-H group content in a range of from 0.01 to 0.3 mol/100 g,

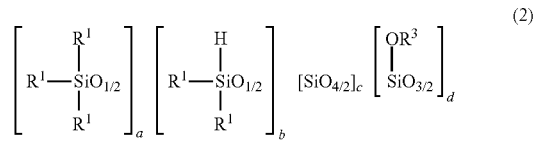

wherein $R^1$, $R^3$, "a", "b", "c", and "d" have the same meanings as defined above; and
(B) a compound having both of an alkenyl group and an epoxy group.

3. The ultraviolet curable silicone composition according to claim 2, wherein (A) the organohydrogenpolysiloxane has a weight average molecular weight of 6000 or more and a form of solid at 25° C.

4. A method of forming a cured film, comprising applying the ultraviolet curable silicone composition according to claim 1 onto a substrate, and
performing ultraviolet irradiation to form a cured film.

5. A method of forming a cured film, comprising
applying the ultraviolet curable silicone composition according to claim 2 onto a substrate, and
performing ultraviolet irradiation to form a cured film.

6. A method of forming a cured film, comprising
applying the ultraviolet curable silicone composition according to claim 3 onto a substrate, and
performing ultraviolet irradiation to form a cured film.

7. The ultraviolet curable silicone composition according to claim 1, further comprising another epoxy group-containing organopolysiloxane in addition to the epoxy group-containing organopolysiloxane represented by formula (1).

8. The ultraviolet curable silicone composition according to claim 1, wherein the onium salt photoinitiator is selected from the group consisting of a diaryl iodonium salt, a triarylsulfonium salt, a triarylselenonium salt, a tetraarylphosphonium salt, and an aryldiazonium salt.

9. The ultraviolet curable silicone composition according to claim 8, wherein an anion in the onium salt photoinitiator is selected from the group consisting of $SbF_6^-$, $AsF_6^-$, $PF_6^-$, $BF_4^-$, $HSO_4^-$, and $ClO_4^-$.

10. The ultraviolet curable silicone composition according to claim 1, wherein an amount of the onium salt photoinitiator is in a range of from 0.1 to 20 parts by mass relative to 100 parts by mass of the ultraviolet curable silicone composition.

11. The ultraviolet curable silicone composition according to claim 1, wherein "a", "b", "c", and "d" satisfy (a+b)/(c+d)=0.6 to 0.9.

12. The ultraviolet curable silicone composition according to claim 1, wherein $R^1$ is a methyl group.

13. The ultraviolet curable silicone composition according to claim 12, wherein $R^3$ is a hydrogen atom.

14. The ultraviolet curable silicone composition according to claim 2, wherein the Si—H group content is in a range of from 0.131 to 0.3 mol/100 g.

* * * * *